United States Patent [19]

Komiyama

[11] Patent Number: 5,264,016
[45] Date of Patent: Nov. 23, 1993

[54] METHOD FOR MANUFACTURING GLASS LENSES

[75] Inventor: Yoshizo Komiyama, Gotenba, Japan

[73] Assignee: Toshiba Kikai Kabushiki Kaisha, Tokyo, Japan

[21] Appl. No.: 756,561

[22] Filed: Sep. 11, 1991

[30] Foreign Application Priority Data

Sep. 12, 1990 [JP] Japan .................................. 2-241917

[51] Int. Cl.$^5$ ............................................ C03B 23/00
[52] U.S. Cl. .......................................... 65/29; 65/102; 65/162
[58] Field of Search .................... 65/64, 102, 104, 111, 65/117, 29, 158, 162

[56] References Cited

U.S. PATENT DOCUMENTS

| | | | |
|---|---|---|---|
| 4,591,373 | 5/1986 | Sato | 65/102 |
| 4,738,703 | 4/1988 | Izumitani | 65/103 |
| 4,915,720 | 4/1990 | Hirota | 65/64 |
| 5,015,280 | 5/1991 | Kimoto | 65/35 |

FOREIGN PATENT DOCUMENTS 2-311322 12/1990 Japan ..................... 65/102

OTHER PUBLICATIONS

Winter, Transformation Region of Glass, Journal American Ceramic Society, vol. 26, No. 6, 1943 pp. 189-200.

Primary Examiner—Joye L. Woodard
Attorney, Agent, or Firm—Cushman, Darby & Cushman

[57] ABSTRACT

A glass blank is molded into a lens while being clamped between a pair of molds and heated by a heater. A mold clamping force is applied, substantially concurrently with the heating, to the molds to deform the lens blank. The mold clamping force is unable to deform the lens blank when the temperature of the lens blank is below a transition point of the lens blank and the mold clamping force is able to deform the lens blank when the temperature of the lens blank is above the transition point. The deformation starting point of the lens blank is detected based on a movement of the molds. A temperature of the molds at the deformation starting point is also detected. The temperature of the molds at the starting point is stored in a control device. The heating of the molds and the lens blank is controlled based on the difference between the temperature stored in the storing step and the transition point of the lens blank so as to prevent the temperature of the lens blank from exceeding the transition point by a predetermined degree. Press molding, with intensification of the mold clamping force, occurs with a progression of the deformation of the lens blank.

2 Claims, 2 Drawing Sheets

METHOD FOR MANUFACTURING GLASS LENSES

BACKGROUND OF THE INVENTION

1. Field of the Invention

This invention relates to a method and apparatus for manufacturing a glass lens of high accuracy. It should be understood that the term glass lens also includes other optical elements made of glass such as a prism, etc.

2. Description of the Related Art

According to a prior art method of manufacturing a glass lens, the temperature of at least one of a paired upper and lower molds is detected. This mold is heated to a temperature higher than the transition point of a lens blank but lower than the softening point of a lens blank so as to heat the lens blank to a moldable temperature. Thereafter, a mold clamping force is applied for press molding the glass lens. In other words, the timing of applying the mold clamping force is determined by taking the mold temperature as a reference.

However, the thermal expansion coefficient of glass in a temperature range higher than the transition point is several times larger than in a temperature range lower than the transition point. Since the thermal expansion coefficient of glass in the high temperature range is substantially larger than that of the mold material, such as ceramics, metal, etc., when the glass lens is press molded in the high temperature range, although the press molded glass lens has a given accuracy, in the period between the press molding and a point at which the temperature of the molded lens is lower than the transition point, the molded lens shrinks greatly. The molds resulting in a so-called sink mark. This tendency increases as the diameter of the lens increases and greatly decreases the accuracy of the lens. Thus, elimination of the problem of forming sink marks has been an important factor for improving the accuracy of the lens. Although this problem can be solved by molding the lens without excessively increasing the temperature of the lens blank, as it is impossible to directly measure the blank temperature it is necessary to estimate the blank temperature from the mold temperature. Moreover, the temperature of the mold is different dependent upon the points at which the temperature is measured. Therefore, with a method of press molding the lens by taking the temperature of the mold as a reference, it is impossible to accurately control the temperature of the lens blank. Also, it has been impossible to satisfactorily press the molds while maintaining the molds at a lower temperature.

SUMMARY OF THE INVENTION

It is an object of the present invention to provide a novel method and apparatus for molding a glass lens of high accuracy which is capable of minimizing formation of sink marks by satisfactory press molding the lens while limiting as far as possible the temperature rise of the lens blank.

Another object of the present invention is to provide a novel method and apparatus for molding a glass lens capable of suppressing formation of sink marks in a high temperature range by closing the molds to a point a little before the perfect closure thereby leaving a small gap, transferring the heating of the molds and the lens blank to cooling, and then controlling the cooling speed and closing speed of the mold such that the molds would be completely closed when the temperature of the lens blank has decreased to a point close to the transition point.

According to one aspect of the invention, there is provided a method of molding a glass lens with a high accuracy comprising the steps of interposing a lens blank between a pair of molds; heating the molds and the lens blank applying a mold clamping force to the molds, substantially concurrently with the heating step, for deforming the lens blank; detecting a deformation point of the lens blank based on the movement of the molds, the mold clamping force being unable to deform the lens blank when the temperature of the lens blank is below a transition point of the lens blank and the mold clamping force being able to deform the lens blank when the temperature of the lens blank is above the transition point; detecting a temperature of the mold at the deformation starting point; storing the temperature of the molds, at the starting point, in a control device; controlling the heating of the molds and the lens blank based on the difference between the temperature stored in the storing step and the transition point temperature of the lens blank so as to prevent the lens blank from reaching a temperature a predetermined degree higher than the transition point and performing a press molding operation with intensification of the mold clamping force with a progression of a deformation of the lens blank.

According to another aspect of the present invention, there is provided an apparatus for molding a glass lens comprising a stationary shaft; a first mold assembly including a first die and secured to one end of the stationary shaft; a second mold assembly including a second die; a movable shaft supporting the second mold assembly; mold clamping means connected to the movable shaft for moving the second mold assembly toward and away from the first mold assembly; a lens blank clamped between the first and second mold die when said first and second mold assemblies are clamped together by the mold clamping means; and a cylinder for defining a molding chamber hermetically sealing the first and second mold assemblies.

Other objects, features and characteristics of the present invention, as well as the methods of operation and functions of the related elements of the structure, and the combination of parts and economies of manufacture, will become more apparent upon consideration of the following detailed description and the appended claims with reference to the accompanying drawings all of which form a part of this specification, wherein like reference numerals designate corresponding parts in the various figures.

DETAILED DESCRIPTION OF THE INVENTION

Figure 1:
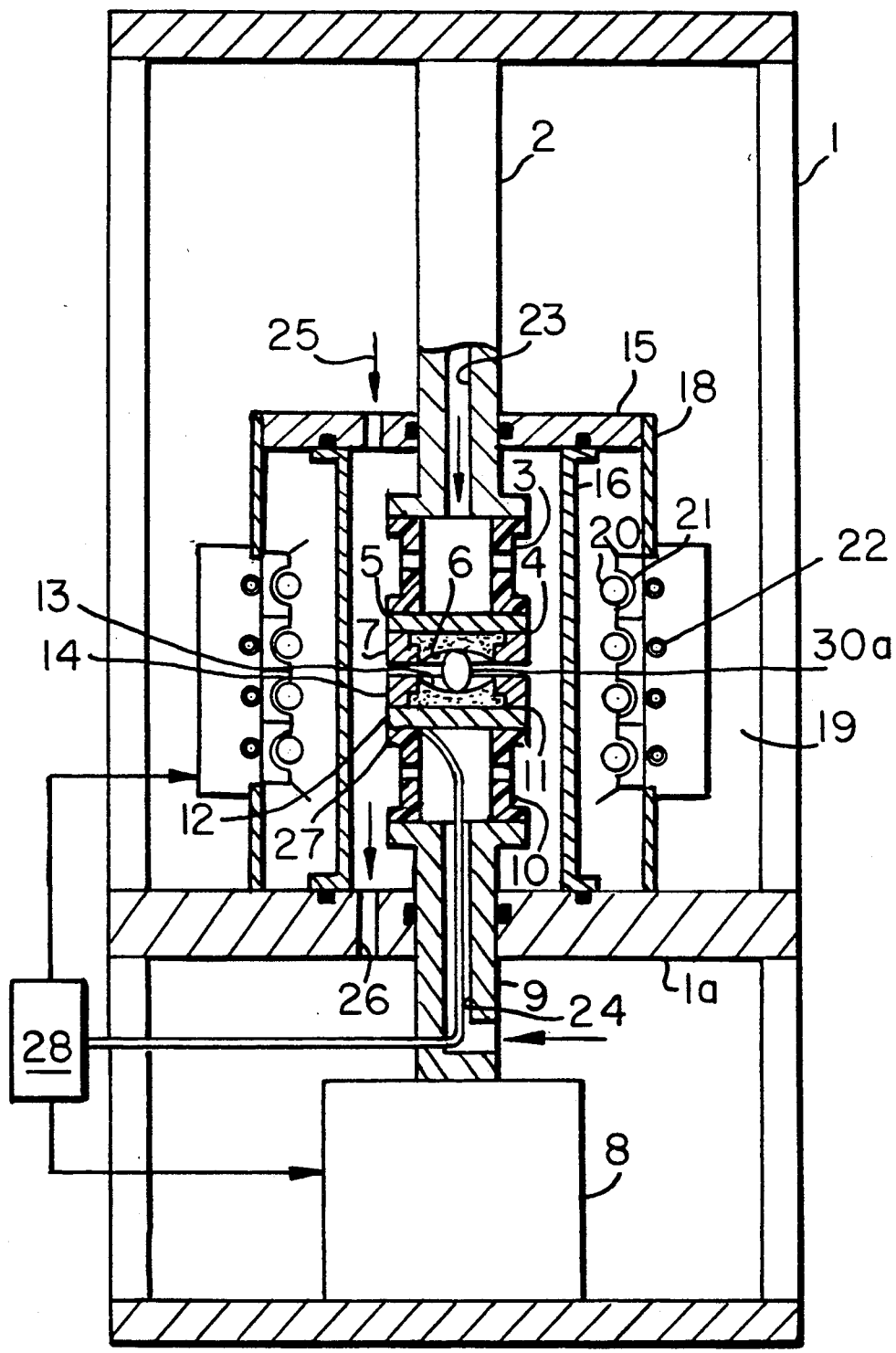
FIG. 1 is a front view, partly in sections showing a preferred embodiment of a glass lens molding machine embodying the invention.

A preferred embodiment of this invention will now be described with reference to the accompanying drawings.

As shown, a stationary shaft 2 extends downward from a frame 1, and an upper mold assembly 4 is secured to the lower end of stationary shaft 2 via a heat insulating cylinder 3 secured to shaft 2 by bolts or the like (not shown). The upper mold assembly 4 is constituted by a die plate 5 made of metal and an upper mold 6 made of ceramics, and a stationary die 7 which secures an upper mold 6 to die plate 5 and forms a portion of the mold.

A mold clamping device 8 is mounted on the lower portion of frame 1 for vertically moving a movable shaft 9 upwardly to oppose stationary shaft 2. A lower mold assembly is secured on the upper end of the movable shaft 9 by a heat insulating cylinder 10. The upper mold assembly 4 forms a pair together with the lower mold assembly 11. The lower mold assembly 11 comprises a die plate 12, a lower mold 13 and a movable die 14.

A bracket 15 is fit about stationary shaft 2. The bracket 15 is movable in the vertical direction by a driving device (not shown). A quartz pipe 16 is secured to bracket 15 to surround paired mold assemblies 4 and 11. The lower end of quartz pipe 16 hermetically abuts against the upper surface of an intermediate plate 1A. The movable shaft 9 slideably extends through the intermediate plate 1A thus, forming a molding chamber 17. The molding chamber 17 is isolated from the surrounding atmosphere and adapted to contain mold assemblies 4 and 11. An outer cylinder 18 is secured to the periphery of bracket 15 and surrounding quartz pipe 16. A lamp unit 19 is mounted on the outer cylinder 18. The lamp unit 19 includes infrared lamps 20 and a reflection mirror 21 disposed on the rear side of the lamps 20, so as to suitably heat mold assemblies 4 and 11. A cooling water pipe 22 and a cold air supply device (not shown) is provided so as to suitably cool lamp unit 19. Stationary shaft 2, movable shaft 9 and bracket 15 are respectively provided with gas supply passages 23, 24 and 25 for filling the molding chamber 7 with inert gas and for cooling mold assemblies 4 and 11, and a lens 30 to be described later. The molding chamber 17 is supplied with inert gas at a predetermined flow rate from a source of inert gas (not shown) via flow control valve (not shown). The inert gas being controlled to a predetermined temperature by a temperature control means (not shown). The inert gas supplied to the molding chamber 17 is discharged to the outside through a discharge opening 26. A thermo-couple 27 is provided for detecting the temperature of lower mold assembly 11. Control means 28 inputs the output signal from thermo-couple 27 and controls the infrared lamp 20, and the mold clamping device 8 as described below.

A method of molding a glass lens using the molding machine described above will now be described. First, bracket 15 is raised along stationary shaft 2 to open the molding chamber 17. Then, a lens blank 30A is mounted on the lower mold 13 which is now positioned at a mold open position lower than the position shown in FIG. 1. The lens blank 30A may be preheated before mounting. It is advantageous that the preheating temperature should be lower than the transition point of glass and lower than the oxidation temperature.

Thereafter, bracket 15 is lowered to close the molding chamber 17 by cooperation with the quartz pipe 16. The molding chamber 17 is filled with an inert gas by supplying it through gas supply passages 23, 24 and 25. Then, movable shaft 9 is raised by operating mold clamping device 8, so as to press lens blank 30A against upper mold 6 as shown in FIG. 1. This urging force, that is the mold clamping force supplied by mold clamping device 8, is set by control means such that when the lens blank 30A is in a low temperature range that is the lens blank is at a temperature lower than the transition point of the lens blank 30A the lens blank 30A can not deform or break and would not be damaged. When the lens blank is maintained in a higher temperature range, above the transition point, the viscosity of the lens blank is lowered, and the lens blank 30A can now be deformed at a temperature as low as possible.

Concurrently, with the operation of the mold clamping device 8, lamp unit 19 is operated for heating mold assemblies 4 and 11 and lens blank 30A. Since the lens blank 30A transmits almost all the heat radiated from infrared lamps 20, the heating of the lens blank due to the radiation from infrared lamps 20 is small. However, the mold assemblies 4 and 11 are heated by the infrared lamps 20. The heating of the lens blank occurs by radiation heat transfer of relatively long wavelengths and by the heat conduction from the mold assemblies 4 and 11 through the surface at which the lens blank 30A is in contact with molds 6 and 13. The degree of heating of the lower mold assembly 11 by infrared lamps 20 is preset, by control means 28, such that the temperature of the lower mold assembly detected by thermo-couple 27 would increase at a predetermined rate.

As the temperature of the mold assemblies 4 and 11 is increased and hence, the temperature of the lens blank, particularly portions thereof in contact with molds 6 and 13 reach a temperature higher than the transition point. Deformation of the lens blank 30A, which has been applied with the mold clamping force, begins from the contact portions between the lens blank 30A and the molds 6 and 13. The result being that the position of lower mold assembly 11 and movable shaft 9 begin to rise. This starting point of deformation is detected by a position detector of control means 28 (not shown) associated with movable shaft 9 or installed in the mold clamping device 8. The temperature at this time is measured by thermo-couple 27 associated with the lower mold assembly. Control means 28 inputs the output signal from thermo-couple 27 in accordance with the command signal from control means 28. Thereafter, the temperature of the lower mold assembly 11 is controlled by controlling the output of infrared lamps 20 by control means 28.

The infrared lamps 20 maintain the temperature of lower mold assembly 11 at the temperature of the mold assembly 11 input by control means 28 or maintains the temperature of the lower mold assembly 11 at a temperature a predetermined amount lower than the temperature of the mold assembly 11 input by control means 28. A lower temperature is maintained because of the time lag of the measured data with respect to the deformation of lens blank 30A. The infrared lamps 20 also maintain the temperature of lower mold assembly 11 at a temperature slightly higher than the temperature of the mold assembly 11 input by control means 28 to a predetermined value higher than that of the deformation initiating point.

Since the lens blank 30A transmits almost all the heat radiated from infra-red lamps 20, the heating of the lens blank 30A, due to the radiation from infra-red lamps 20, is small. However, the mold assemblies 4 and 11 are hated by the infra-red lamps 20. The heating of the lens blank occurs by radiation heat transfer of relatively long wavelengths and by heat conduction from the mold assemblies 4 and 11 through the surface in which the lens blank 30A is in contact with the mold 6 and 13. Thus, the temperature of the lens blank 30A is lower than the mold assemblies 4 and 11. The temperature of the portion of the lens blank 30A in contact with the mold 6 and 13 is also lower than the temperature of the lower mold assembly. Thus, at the time the temperature of the contact surface of the lens blank 30A reaches the transition point, the temperature of the lower mold assembly is higher than the transition point. After the deformation of the lens blank 30A has begun, if the temperature of the lower mold assembly is kept at the temperature of the deformation starting time, the temperature of the lens blank 30A will rise to the detected temperature. The transition point temperature of the lens blank 30A can, of course, be predetermined based on the knowledge of the material of the lens blank. Thus, the temperature difference detected at the deformation starting time, that is, the temperature difference between the lower mold assembly and the transition point, is known. The temperature control is executed based on this temperature difference so as to prevent the temperature of the lens blank from exceeding the transition point by a predetermined degree. The actual control temperature will, of course, vary depending upon e.g., the transition temperature of the lens blank, the size of the lens blank, the size of the mold assemblies, etc.

Due to this heat control, the temperature of the lens blank 30A is maintained at a temperature lower than the highest temperature of the contact portions of molds 6 and 13; at which the lens blank can be deformed. The temperature of the contact portion of the lens blank is kept a little higher than the deformable temperature. The temperature of the contact portion of the lens blank is the highest part of the lens blank. As the deformation begins, the contact area between lens blank 30A and molds 6 and 13 increases. As a result, the lens blank 30A receives more heat, thus permitting easier deformation and a relatively fast press molding. Since as the increase in the contact area results in the decrease of the surface pressure applied to the lens blank 30A it becomes possible to gradually increase the mold clamping force with the progression of the press molding. The mold clamping force can be controlled by knowing the value of the amount or rise of the movable shaft 9 or the progress time after starting the deformation.

In this manner, the upper and lower mold assemblies are brought to the final mold closing state. When the press molding operating is completed, the infrared lamps 20 are turned off and cold inert gas is supplied through gas supply passages 23, 24 and 25 for cooling the mold assemblies 4 and 11 and the molded lens. Then, the molding chamber 17 and mold assemblies 4 and 11 are opened for taking out the molded lens.

Although, the temperatures of the molded lens and of the mold assemblies 4 and 11 are at a temperature a little bit higher than the transition temperature when the press molding is complete, it is still possible to prevent the generation of sink marks during cooling. When the lens is molded at a temperature a predetermined degree higher than the transition point it is impossible to prevent generation of a sink mark which occurs during cooling.

Figure 2:
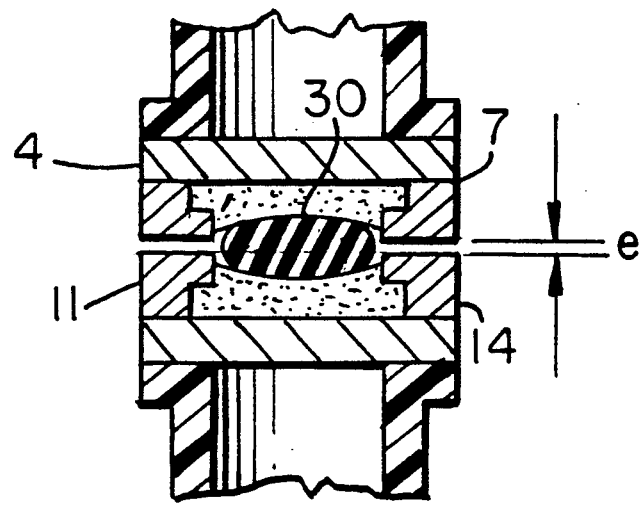
FIG. 2 is a sectional view showing an assembly of molds in a condition, a just prior to the finally closed mold state.

For this reason, as shown in FIG. 2, just before the stationary die 7 and the movable die 14 of the mold assemblies 4 and 11 come to a closed state, that is leaving a small gap e therebetween, it is advantageous that the infrared lamps 20 are turned off, and that the cooling speed and the closing speed of the molds are controlled in the following manner. The size of gap e may be equal to or a little greater than the variation in the thickness caused by the shrinkage of the lens 30 which occurs during the cooling step after molding. It is advantageous to make the gap e as small as possible so as to smoothly perform succeeding molding operations. The fact that the gap e has reached a predetermined value can be detected by a suitable position detector (not shown) which measures the position of the movable shaft 9 or the distance between the stationary die 7 and movable die 14. Since the molding cycle time is relatively stable, the fact that the gap e has reached a predetermined value can also be detected with a timer detecting the interval elapsed after starting the mold closing operation. The position of the movable shaft 9 can be correctly confirmed by using a servomotor for mold clamping device 8. With this driving mechanism, the movable shaft can be stopped at a correct position and can start from a desired point.

As described above, after turning off the infrared ray lamps 20 and admitting the inert gas which has been cooled to a predetermined temperature through gas supply passages 23, 24 and 25, the mold assemblies 4 and 11 are cooled. At this time, the mold clamping force is still being maintained and the gap e is gradually decreased in proportion to the temperature decreases of the mold assemblies 4 and 11. When the gap e is decreased to zero, the final mold closing condition is reached under which a lens 30 having a predetermined thickness can be produced, the quantity of the inert gas supplied or its temperature or the mold clamping force can be controlled by control means 28. The control of the quantity of the inert gas supplied or its temperature or the mold clamping force can be effected by detecting the mold clamping speed with a position detector (not shown) during the actual molding operation. Such control can also be effected by detecting, with the thermocouple 27, the temperature of the interval until the final mold clamping state is reached or at the point at which the molds are finally closed. When the temperature decreasing speed of the mold assemblies 4 and 11 is lower than the mold closing speed, the quantity of the inert gas is increased during the succeeding molding operations or the temperature of the inert gas is decreased or the mold clamping force is decreased to match the lens cooling speed and the mold closing speed.

Where the lens cooling speed is faster than the mold closing speed the quantity of supply of the inert gas is decreased. When the temperature at the final mold closing state is lower than the transition point it becomes impossible to effect satisfactorily molding. For this reason, it is preferable to control the temperature of the mold to be close to or higher than the transition point. Since there is a difference between the output and the temperature of lens 30 it is desirable to correct the output to prevent the sink mark.

Thereafter, while maintaining the mold clamping force, the supply of the inert gas is continued. When the mold assemblies 4 and 11 and lens 30 have been sufficiently cooled, the supply of the inert gas is stopped, molding chamber 17 is opened, the lower mold assembly is lowered and the molds are opened to take out lens 30.

Although in the foregoing embodiment, infrared lamps 20 were used as the heating source, other heating sources, for example, a high frequency heater, can also be used. The mold clamping device 8 can be operated by an electric motor, a servomotor for example, so as to electrically control the mold clamping force and the mold closing speed.

As described above, according to the present invention, it is possible to mold a lens at a low temperature suitable for a lens blank. Thus, it is possible not only to substantially reduce the chance of a sink mark but also to prevent waste heat, a reasonable and efficient molding.

When the press molding is performed by controlling the temperature of the lens blank to be higher than the transition point by a predetermined value, it is possible to perfectly prevent generation of any sink mark in a high temperature range higher than the transition point by transferring the heating of the molds and the lens blank to cooling when the mold clamping operation proceeds to a point a little before the complete closure of the molds (that is leaving a small gap e), and by matching the mold cooling speed and the mold closing speed. When the temperature of the lens blank has decreased to a value close to the transition point, the molds would be completely closed.

What is claimed is:

1. A method of molding a glass lens comprising the steps of:
   interposing a lens blank between a pair of molds;
   heating the molds and the lens blank;
   applying a mold clamping force, substantially concurrently with the heating step, to said molds for deforming said lens blank, said mold clamping force being unable to deform the lens blank when the temperature of the lens blank is below a transition point of the lens blank and said mold clamping force being able to deform the lens blank when the temperature of the lens blank is above said transition point;
   detecting a deformation starting point of said lens blank based on a movement of said molds;
   detecting a temperature of said molds at the deformation starting point;
   storing the temperature of said molds, at the starting point, in a control device;
   controlling the heating of the molds and the lens blank based on the difference between the temperature stored in the storing step and the transition point of the lens blank so as to prevent the temperature of the lens blank from exceeding the transition point by a predetermined degree; and
   press molding with intensification of the mold clamping force with a progression of a deformation of the lens blank.

2. The method according to claim 1 wherein said press molding step is performed by
   transferring heating of the molds to cooling immediately before a complete closure of the molds leaving a small gap between said pair of molds; and
   making a mold cooling speed and a mold closing speed equal to each other so that the molds would be completely closed when the temperature of said lens blank has decreased to a value near said transition point.

* * * * *